US008330845B2

(12) United States Patent
Yamada et al.

(10) Patent No.: US 8,330,845 B2
(45) Date of Patent: Dec. 11, 2012

(54) IMAGE PROCESSING UNIT

(75) Inventors: Akira Yamada, Osaka (JP); Suguru Takamatsu, Osaka (JP)

(73) Assignee: Panasonic Corporation, Osaka (JP)

( * ) Notice: Subject to any disclaimer, the term of this patent is extended or adjusted under 35 U.S.C. 154(b) by 171 days.

(21) Appl. No.: 12/811,726

(22) PCT Filed: Jan. 6, 2009

(86) PCT No.: PCT/JP2009/000016
§ 371 (c)(1),
(2), (4) Date: Jul. 6, 2010

(87) PCT Pub. No.: WO2009/087962
PCT Pub. Date: Jul. 16, 2009

(65) Prior Publication Data
US 2011/0122293 A1    May 26, 2011

(30) Foreign Application Priority Data
Jan. 7, 2008    (JP) ................................ 2008-000328

(51) Int. Cl.
*H04N 5/222*    (2006.01)
(52) U.S. Cl. .......... 348/333.12; 348/231.99; 348/333.05
(58) Field of Classification Search .............. 348/333.12
See application file for complete search history.

(56) References Cited

U.S. PATENT DOCUMENTS

| | | | |
|---|---|---|---|
| 6,883,140 B1 | 4/2005 | Acker et al. | |
| 6,937,356 B1 | 8/2005 | Ito et al. | |
| 7,268,810 B2 * | 9/2007 | Yoshida | 348/240.2 |
| 2001/0040684 A1 | 11/2001 | Takahashi | |
| 2002/0180764 A1 | 12/2002 | Gilbert et al. | |
| 2006/0031902 A1 * | 2/2006 | Creamer et al. | 725/105 |
| 2006/0039630 A1 | 2/2006 | Kotani | |
| 2007/0216782 A1 * | 9/2007 | Chernoff | 348/231.99 |

(Continued)

FOREIGN PATENT DOCUMENTS

CN    1212566 A    3/1999
(Continued)

OTHER PUBLICATIONS

Operating Instructions Manual for the Panasonic DMC-FX30 Digital Camera, 2007.*

(Continued)

*Primary Examiner* — Anthony J Daniels
(74) *Attorney, Agent, or Firm* — Renner, Otto, Boisselle & Sklar, LLP

(57) ABSTRACT

An image processor that can get a number of image files resized collectively is provided in order to realize a more user-friendly resizing function.
The image processor includes: a control section configured to select a particular set of resizing conditions from a plurality of sets of resizing conditions in accordance with a user's instruction; and an image processing section configured to perform resizing processing on each of a plurality of images in accordance with the selected particular set of resizing conditions. Each set of resizing conditions specifies a plurality of estimated resized image sizes. Each estimated resized image size is associated with a respective image aspect ratio. For said each of the plurality of images to be resized, the image processing section selects an estimated resized image size from the selected particular set of resizing conditions according to the aspect ratio of said each of the plurality of images and performs the resizing processing on said each of the plurality of images in accordance with the selected estimated resized image size.

10 Claims, 10 Drawing Sheets

U.S. PATENT DOCUMENTS

2010/0002002 A1* 1/2010 Lipsky et al. ............... 345/441

FOREIGN PATENT DOCUMENTS

| JP | 11-215451 | 8/1999 |
|---|---|---|
| JP | 2000-040142 | 2/2000 |
| JP | 2000-215322 | 8/2000 |
| JP | 2000-278521 | 10/2000 |
| JP | 2002-196622 | 7/2002 |
| JP | 2006-094467 | 4/2006 |
| JP | 2006-146730 | 6/2006 |
| JP | 2006-318260 | 11/2006 |
| WO | 00/00927 A1 | 1/2000 |

OTHER PUBLICATIONS

Supplementary European Search Report for corresponding European Application No. 09700497.2 dated Jul. 1, 2011.
Chinese Office Action for corresponding Chinese Application No. 200980000299.8 issued Jul. 20, 2011 and partial English translation.
International Search Report for corresponding International Application No. PCT/JP2009/000016 mailed Feb. 17, 2010.
Operating Instructions for DMC-FX30.

* cited by examiner

| SIZE | NUMBER OF HORIZONTAL PIXELS × NUMBER OF VERTICAL PIXELS |
|---|---|
| 10M | 3648 × 2736 |
| 8M | 3264 × 2448 |
| 5M | 2560 × 1920 |
| 3M | 2048 × 1536 |
| 2M | 1600 × 1200 |

(a)

| SIZE | NUMBER OF HORIZONTAL PIXELS × NUMBER OF VERTICAL PIXELS |
|---|---|
| 8.5M | 3600 × 2400 |
| 7M | 3248 × 2160 |
| 4.5M | 2560 × 1712 |
| 2.5M | 2048 × 1360 |

(b)

| SIZE | NUMBER OF HORIZONTAL PIXELS × NUMBER OF VERTICAL PIXELS |
|---|---|
| 7M | 3584 × 2016 |
| 5.5M | 3072 × 1728 |
| 2M | 1920 × 1080 |

RESIZE
　　☐ ASPECT RATIO
　　　　(NUMBERS OF PIXELS)
　　☐ INTENDED USE (PRINTING, ETC.)

(b)

ASPECT-RATIO-BASED RESIZING

| 4:3 | 10M | 3:2 | 9M | 16:9 | 7.5M |
|---|---|---|---|---|---|
| | 5M | | 4.5M | | 3.5M |
| | 3M | | 2.5M | | 2M |
| | 2M | | 1.7M | | 2M |
| | 0.3M | | 0.3M | | 0.2M |

(c)

RESIZING ACCORDING TO
INTENDED USE
　A3
　A4
　SIZE L2/L
　E-MAIL
　PRESENT ON HDTV

IMAGE PROCESSING UNIT

TECHNICAL FIELD

The present invention relates to a technique for resizing an image that has been captured with a digital camera, for example.

BACKGROUND ART

As digital cameras have been rapidly gaining widespread popularity lately, the maximum quality and resolution of photos that can be shot with those cameras have been on the rise. Meanwhile, to make those cameras come in even handier for users, various functions have been proposed one after another.

An image resizing function is one of those new functions that have recently proposed to make the cameras handier to use. The image resizing function allows the user to change the sizes of an image at an arbitrary point in time after it was shot with a digital camera. For example, if a file of an image that was shot at a size of 3 megapixels (where "mega" means one million and will sometimes be abbreviated herein as "M") is resized into an image file with a size of 300 kilopixels (where "kilo" means one thousand and will sometimes be abbreviated herein as "K") by operating the digital camera in order to attach that image file to an email message, then the user does not need to resize that image file using an image editor program of a personal computer, for example.

An image processor as disclosed in Patent Document No. 1 processes image data that has been captured and generated to make a completed image. And based on that completed image, the control section thereof extracts a subject's face area, performs zoom-in processing on the image data of the completed image data according to the size of the face area, and outputs the resultant data to an image storage section.

Japanese Patent Application Laid-Open Publication No. 2006-318260

DISCLOSURE OF INVENTION

Problems to be Solved by the Invention

The image processor disclosed in Patent Document No. 1 can certainly perform zoom-in processing according to the size of the subject's face area. However, Patent Document No. 1 does not disclose that the processor can resize multiple image files collectively. If the processor can resize only one image a time, then the same resize operation should be started all over again on one image after another, thus forcing the user to do troublesome operations a number of times.

It is therefore an object of the present invention to get a number of image files resized collectively, thereby providing a more user-friendly resizing function.

Means for Solving the Problems

An image processor according to the present invention includes: a control section configured to select a particular set of resizing conditions from a plurality of sets of resizing conditions in accordance with a user's instruction; and an image processing section configured to perform resizing processing on each of a plurality of images in accordance with the selected particular set of resizing conditions. Each set of resizing conditions specifies a plurality of estimated resized image sizes. Each estimated resized image size is associated with a respective image aspect ratio. For said each of the plurality of images to be resized, the image processing section selects an estimated resized image size from the selected particular set of resizing conditions according to the aspect ratio of said each of the plurality of images and performs the resizing processing on said each of the plurality of images in accordance with the selected estimated resized image size.

The image data of said each of the plurality of images to be resized may include aspect ratio information that tells the aspect ratio of that image. By reference to the aspect ratio information, the image processing section may find the aspect ratio of said each of the plurality images and may select an estimated resized image size from the selected particular set of resizing conditions.

The plurality of sets of resizing conditions may define mutually different combinations of estimated resized image sizes for a plurality of image aspect ratios.

The image processor may further include: a display device for presenting an image thereon; and an interface that allows the user to choose the image presented on the display device. The image processing section may designate the image that has been chosen with the interface as the image to be resized.

Image data of each of a plurality of images to be resized may include thumbnail data. The image processor may further include: a display device for presenting a thumbnail thereon; and an interface that allows the user to choose the thumbnail presented on the display device. The image processing section may designate the image associated with the thumbnail that has been chosen with the interface as the image to be resized.

The image processor may further include: an interface that accepts a user's command; and a storage section that stores the image data of the plurality of images in at least one folder. The image processing section may perform the resizing processing on an image, of which the image data is stored in a folder that has been specified beforehand in accordance with the command accepted at the interface.

The image processor may further include: an interface that accepts a user's command; and a storage section that stores the image data of the plurality of images. The image data of each of the plurality of images may include shooting condition information representing a condition on which that image was shot. The image processing section may perform the resizing processing on an image, of which the image data matches the shooting condition information that has been specified beforehand in accordance with the command accepted at the interface.

The image processor may further include an interface that accepts a user's command. The image processing section may perform the resizing processing on an image, of which the image data matches a shooting period that has been specified beforehand in accordance with the command accepted at the interface.

The storage section may include a removable storage medium.

Effects of the Invention

According to the present invention, multiple image files can be resized collectively even if their aspect ratios and image sizes chosen and stored are different from each other, thus providing a more user-friendly image resizing function.

Figure 1:
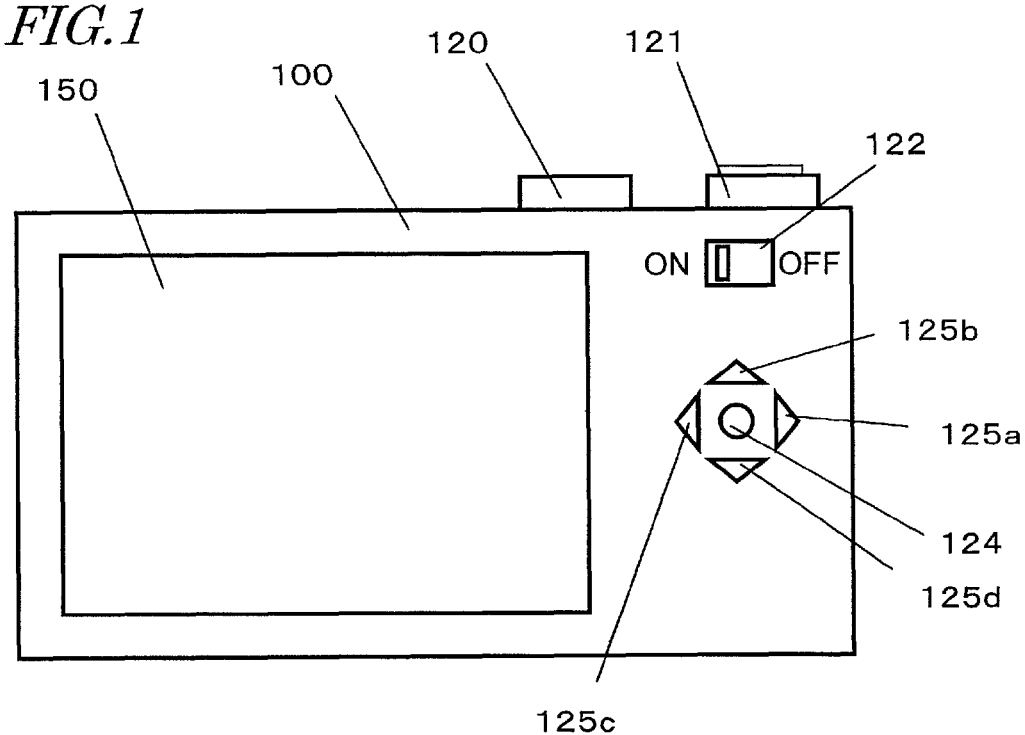
FIG. 1 illustrates a configuration for a digital camera as an example of an image processor according to the present invention.

Portion (a) of FIG. 16 illustrates an exemplary dialog box that allows the user to decide whether he or she wants to get the resizing processing done either on an aspect ratio basis or according to the intended use; portion (b) of FIG. 16 illustrates an exemplary dialog box to be displayed when he or she wants to get the resizing processing done on an aspect ratio basis; and portion (c) of FIG. 16 illustrates an exemplary dialog box to be displayed when he or she wants to get the resizing processing done according to the intended use.

DESCRIPTION OF REFERENCE NUMERALS 1 lens
2 CCD
3 A/D converter
4 image processing section
5 storage section
5a input/output section
5b memory card
6 interface section
7 control section
40 signal processor
150 LCD monitor

BEST MODE FOR CARRYING OUT THE INVENTION

Hereinafter, preferred embodiments of the present invention will be described with reference to the accompanying drawings.

First of all, the terms for use to describe those preferred embodiments will have the following meanings.

The "size" refers to the data size of image data or the size of a display area (which will also be referred to herein as an "on-screen size") to be determined by the horizontal and vertical numbers of pixels of a given image. In the following description of preferred embodiments, the "size" will refer to the "data size" unless otherwise stated, and when we mean "on-screen size" by "size", either an "image size" or "on-screen size" will be used instead.

Generally speaking, if the number(s) of horizontal and/or vertical pixels (or the on-screen size) of a given image changes, then the data size will also change. That is why there is a close correlation between data size and on-screen size. Thus, it should be noted that the "size" is supposed herein to refer to the "data size" just for convenience sake.

The "aspect ratio" of an image refers herein to the ratio of the number of horizontal pixels of an image to that of vertical pixels thereof. For example, an aspect ratio of 4:3 means that the ratio of the number of horizontal pixels of an image to that of vertical pixels thereof is 4 to 3.

Hereinafter, preferred embodiments of an image processor according to the present invention will be described.

In the following description of preferred embodiments, the image processor is supposed to be a digital camera, and a configuration for a digital camera will be described. However, the digital camera is just an example of the present invention. To prove that, a configuration for another image processor according to the present invention will be described later.

1. Configuration 1-1. General Appearance

FIG. 1 illustrates a configuration for a digital camera as an example of an image processor according to the present invention. Specifically, FIG. 1 illustrates the rear side of the digital camera.

On the rear side of the digital camera 100, arranged are a power switch 122, a menu button 124, cross keys 125a, 125b, 125c and 125d, and a liquid crystal display (LCD) monitor 150. On the top surface of the digital camera 100, arranged are a mode dial 120 and a shutter release button 121.

Figure 2:
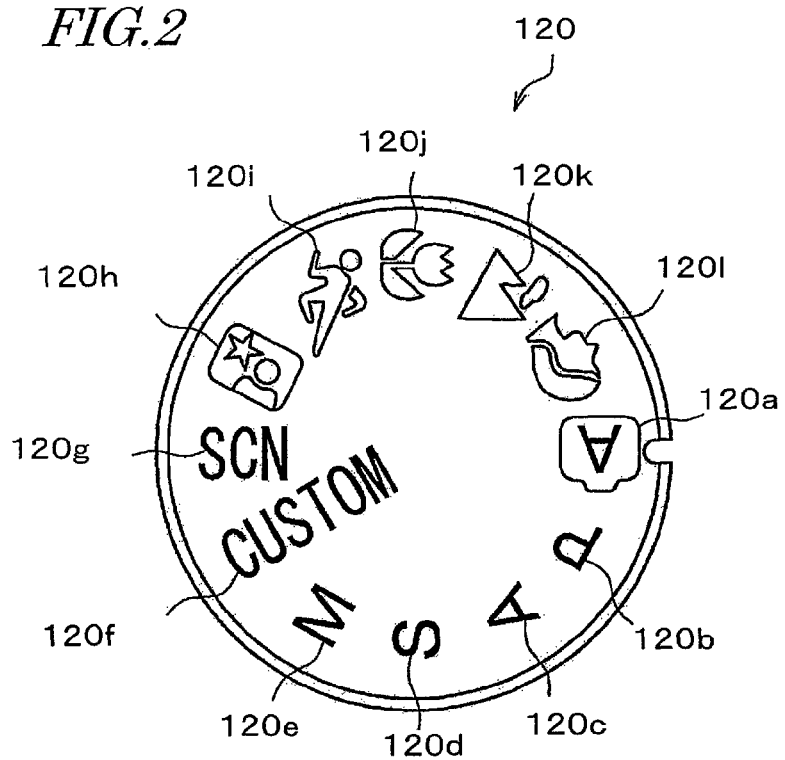
FIG. 2 is a top view of the mode dial 120.

FIG. 2 is a top view of the mode dial 120. On the top surface of the mode dial 120, printed are several icons 120a through 120l representing various shooting modes and scene modes. By turning this mode dial 120, the user can select his or her desired shooting mode or scene mode. In the example illustrated in FIG. 2, a mode represented by the icon 120a is currently selected.

Next, it will be described briefly what modes those icons 120a through 120l at the top of the mode dial 120 represent.

Specifically, the icons 120a, 120b, 120c, 120d and 120e represent a full automatic mode, a program mode, an aperture priority mode, a shutter priority mode, and a manual mode, respectively. The icon 120f represents a custom mode that allows the user to save his or her favorite settings. The icon 120g gets shooting modes other than the various scene modes to be described below shown on the LCD monitor 150. One of those shooting modes is selectable with the menu button 124 and the cross keys 125a, 125b, 125c and/or 125d. And the icons 120h, 120i, 120j, 120k and 120l represent a portrait with night view mode, a sport mode, a macro mode that allows the user to take a close-up shot, a scenery shooting mode, and a portrait mode for shooting a person as a main subject, respectively.

The digital camera 100 of this preferred embodiment has, as the "shooting modes other than the various scene modes", the full automatic mode, the program mode, the aperture priority mode, the shutter priority mode, the manual mode, and the custom mode. In addition, as the various scene modes, the digital camera 100 of this preferred embodiment has not only the portrait with night view mode, the sport mode, the macro mode, the scenery mode, and the portrait mode that can be directly selected by turning the mode dial 120, but also a baby mode, a party mode and other scene modes that will be shown on the LCD monitor 150 and selectable by turning the mode dial 120 to the scene mode icon 120g and then pressing the menu button 124 and the cross keys 125a, 125b, 125c and 125d.

If the power switch 12 is turned to the ON side, the digital camera 100 is powered. Then, by turning the dial 120, the user selects his or her desired shooting mode or scene mode. As the subject's image is presented on the LCD monitor 150, he or she determines the composition while watching the image on the monitor. And when he or she presses down the shutter release button 121, the subject's image gets stored as an image file.

On the header of the image file, the shooting date and time, the shooting mode or scene mode selected by turning the mode dial 120, and the numbers of horizontal and vertical pixels of the image are recorded as will be described in detail later with reference to FIG. 6.

When the user presses down the menu button 124, a dialog box will be displayed on the LCD monitor 150. On that dialog box, the user can choose his or her desired aspect ratio and numbers of horizontal and vertical pixels for an image to be shot by tapping the menu button 124 and the cross keys 125a, 125b, 125c and 125d. This digital camera 100, which is an exemplary image processor according to the present invention, allows the user to choose one of 4:3, 3:2 and 16:9 as the aspect ratio of the image.

Figures 3, 4:
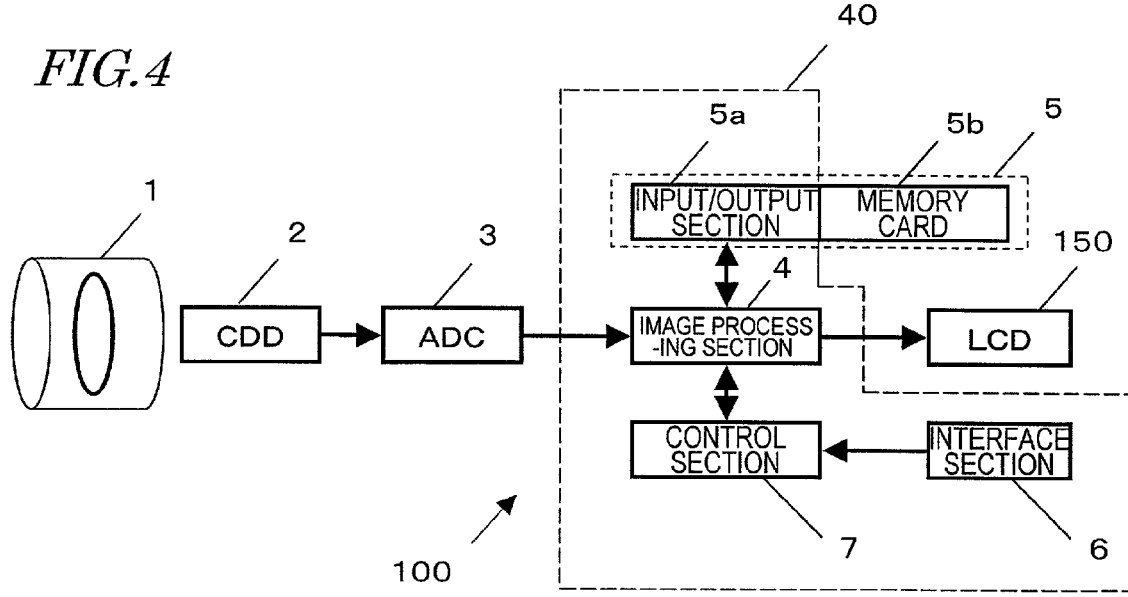
FIG. 3 shows various combinations of numbers of vertical and horizontal pixels of images, from which choice should be made at the respective aspect ratios of the images.
FIG. 4 is a block diagram illustrating a configuration for a digital camera 100 as a preferred embodiment of the present invention.

FIG. 3 shows various combinations of numbers of vertical and horizontal pixels of images, from which choice should be made at the respective aspect ratios of the images. Specifically, FIG. 3(a) shows the various sizes and combinations of numbers of vertical and horizontal pixels of images, from which the user needs to make a choice when the image has an aspect ratio of 4 to 3. FIG. 3(b) shows the various sizes and combinations of numbers of vertical and horizontal pixels of images, from which the user needs to make a choice when the image has an aspect ratio of 3 to 2. And FIG. 3(c) shows the various sizes and combinations of numbers of vertical and horizontal pixels of images, from which the user needs to make a choice when the image has an aspect ratio of 16 to 9. For example, if the image shot has an aspect ratio of 4 to 3 and a size of 10 M, the numbers of horizontal and vertical pixels of that image are 3,648 and 2,736, respectively. It should be noted that the size of 10 M means that the image shot would have approximately 10 million (=10,000,000) pixels in total. More exactly, in this example, the total number of pixels would be 3,648×2,736=9,980,928 pixels.

1-2. Block Arrangement

FIG. 4 is a block diagram illustrating a configuration for the digital camera 100 of this preferred embodiment.

The digital camera 100 includes a shooting optical system 1, a CCD 2, an A/D converter 3, a signal processor 40 and the LCD monitor 150.

The shooting optical system 1 produces an optical image of the subject. The CCD 2 transforms the optical image that has been produced by the shooting optical system 1 into an electrical signal. The A/D converter 3 converts the electrical signal (which has been generated as an analog signal through transformation by the CCD 2) into a digital signal.

The signal processor 40 receives the digital signal from the A/D converter 3 and also accepts a user's command that has been entered with buttons or keys on the digital camera 100. Then, in accordance with that command, the signal processor 40 processes the digital signal. For example, the signal processor 40 processes the digital signal representing an image to generate image data and then writes that image data as an image file on a memory card 5b.

The LCD monitor 150 presents the image represented by the image data that has been generated by the signal processor 40 and also displays a menu and selected options.

The signal processor 40 includes an image processing section 4, an input/output section 5a, an interface section 6, and a control section 7.

The image processing section 4 performs a predetermined type of signal processing on the digital signal that has been generated by the A/D converter 3, thereby generating image data.

The input/output section 5a writes the image data that has been generated by the image processing section 4 onto the memory card 5b and may also read image data from the memory card 5b. It should be noted that the memory card 5b is removable from the digital camera 100 and does not have to form an integral part of the digital camera 100. In this description, however, the input/output section 5a and the memory card 5b will sometimes be collectively referred to herein as a "storage section 5", which stores the image data that has been generated by the image processing section 4.

The interface section 6 accepts a user's command that has been given to the digital camera 100. In the rear view of the digital camera 100 shown in FIG. 1, the interface section 6 corresponds to the menu button 124 and the arrow keys 125a, 125b, 125c and 125d.

In accordance with the command that has been relayed by the interface section 6, the control section 7 controls the image processing section 4.

Optionally, the A/D converter 3 could be built in an AFE (analog front end) LSI (not shown) for subjecting the electrical signal (analog signal) that has been generated by the CCD 2 to a predetermined type of signal processing. Alternatively, the A/D converter 40 could also be built in the signal processor 40.

If necessary, the image processing section 4 and the control section 7 could be implemented as a single LSI.

And the signal processor 40 could be implemented as a general computer system as well.

Figure 5:
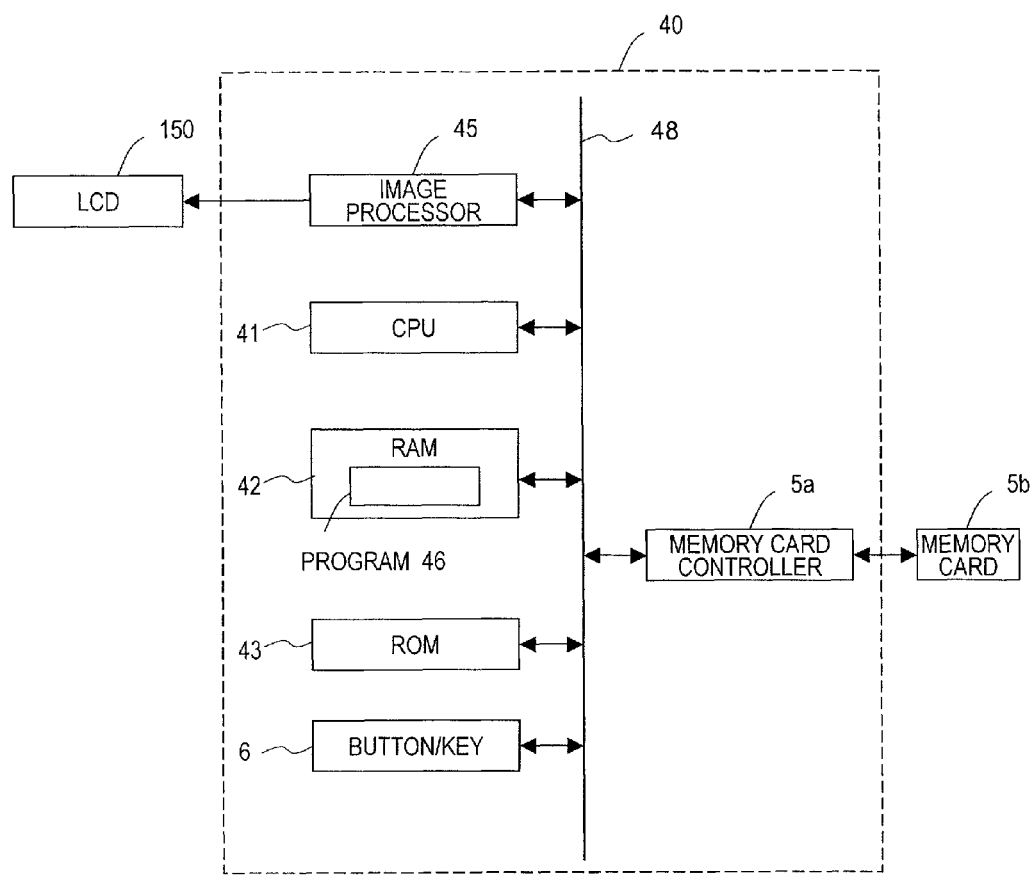
FIG. 5 illustrates an exemplary hardware configuration for the signal processor 40.

As an example, FIG. 5 illustrates an exemplary hardware configuration for the signal processor 40.

The signal processor 40 includes a CPU 41, a RAM 42, a ROM 43, one or more buttons/keys 6, an image processing circuit 45 and a memory card controller 5a, all of which are connected together with a bus 48 so that information can be exchanged between them.

The CPU 41 retrieves a computer program 46 that is stored on the ROM 43, loads the program 46 into the RAM 42 and then executes it there. Not only the signal processing circuit 40 but also the digital camera 100 itself should follow this computer program 46 to carry out the processing to be described later. Optionally, the ROM 43 may be a programmable ROM such as an EEPROM. When the computer program 46 is executed by the CPU 41, the CPU 41 is operated in the processing procedure shown in FIGS. 8 and 13, for example.

The image processing circuit 45 generates the data of the image to be presented on the LCD monitor 150. The memory card controller 5a is a specific component that is equivalent to the input/output section 5a described above, and therefore, is identified by the same reference numeral as the input/output section 5a.

1-3. Image Format

The digital camera 100, which is an exemplary image processor according to the present invention, writes an image file on the memory card 5b in the format called "Exif (exchangeable image file format)".

Figure 6:
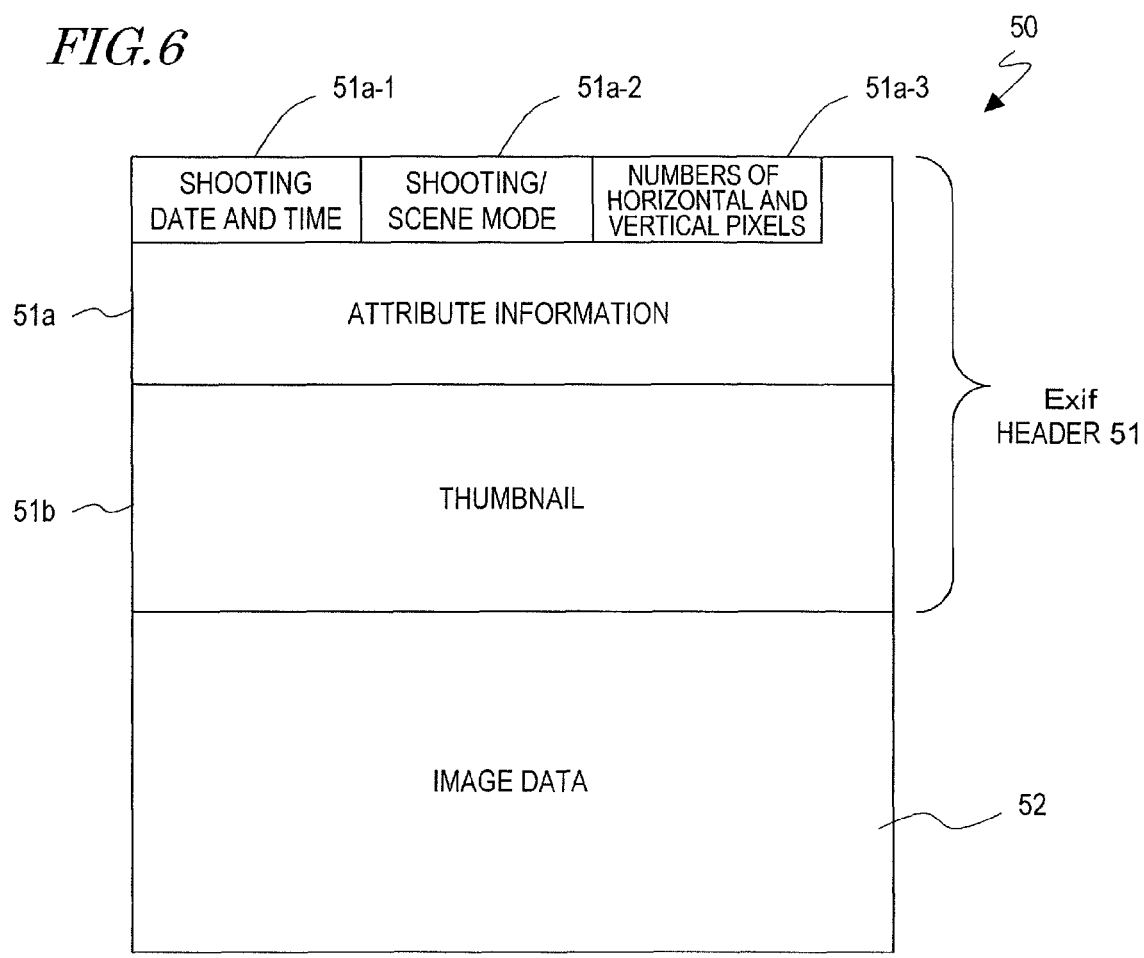
FIG. 6 illustrates diagrammatically the structure of an image file 50 compliant with the Exif format.

FIG. 6 illustrates diagrammatically the structure of an image file 50 compliant with the Exif format. According to the Exif format, a header portion (which will be referred to herein as an "Exif header") 51 is added to image data (main image) 52. In the Exif header 51, the attribute information 51*a* of the image data (main image) 52 and thumbnail image data 51*b* are written. The attribute information 51*a* includes shooting date and time information 51*a*-1, shooting/scene mode information 51*a*-2 and the numbers of horizontal and vertical pixels information 51*a*-3, which tells the user the aspect ratio of a given image.

In this case, the shooting/scene mode corresponds to a shooting mode according to the present invention. The mode information 51*a*-2 is just a piece of information about the shooting conditions. The numbers of horizontal and vertical pixels of the image are equivalent to information about the aspect ratio and size of an image according to the present invention.

Figure 7:
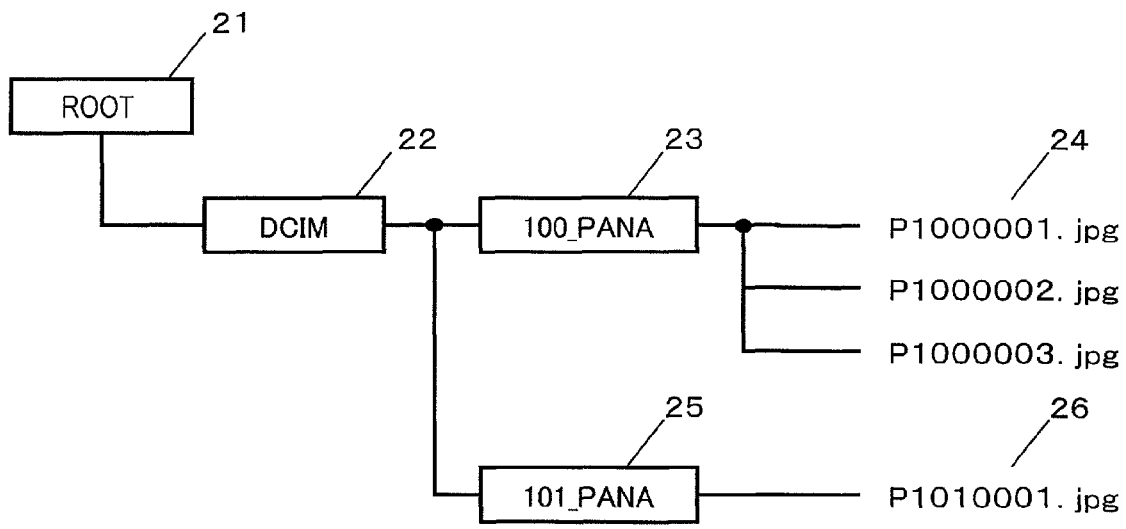
FIG. 7 illustrates diagrammatically the folder hierarchy of the memory card 5b.

FIG. 7 illustrates diagrammatically the folder hierarchy of the memory card 5*b*. The root folder 21 is the highest-order folder of the folder hierarchy and every folder or image file starts to be written from this layer. The DCIM 22 is a folder defined by the DCF (design rule for camera file system) standard. The 100_PANA 23 and 101_PANA 25 are folders to store image files, and are formed on a layer right under the DCIM 22. The DCF standard requires that every file name consist of a three-digit number of 100 through 999 and five arbitrary letters. In this example of the folder hierarchy, 100 and 101 are used as the three-digit numbers and PANA is used as the five arbitrary letters. P1000001.jpg through P100003.jpg (24) written on the layer right under 100_PANA 23 and P1010001.jpg 26 written on the layer right under 101_PANA 25 are image files. The DCF standard requires that the file name of every image file consist of four arbitrary letters and a four-digit number of 0001 through 9999. In this example of the folder hierarchy, P100 and P101 are used as four arbitrary letters and 0001 through 0003 are used as four-digit numbers.

2. Operation

Hereinafter, it will be described how the digital camera 100 of this preferred embodiment operates to carry out resizing processing.

2-1. Outline

According to this preferred embodiment, multiple image files can be subject to the resizing processing collectively. As used herein, the "resizing processing" refers to processing of changing the size of the file of the image shot (i.e., the file size) into a user's specified size. The resizing processing can be done collectively on multiple image shots, and therefore, the user needs to get the same operation done a significantly reduced number of times.

2-2. Setting Processing

Hereinafter, it will be described with reference to FIGS. 8 through 11 exactly how the digital camera 100 of this preferred embodiment performs the resizing processing.

Figure 8:
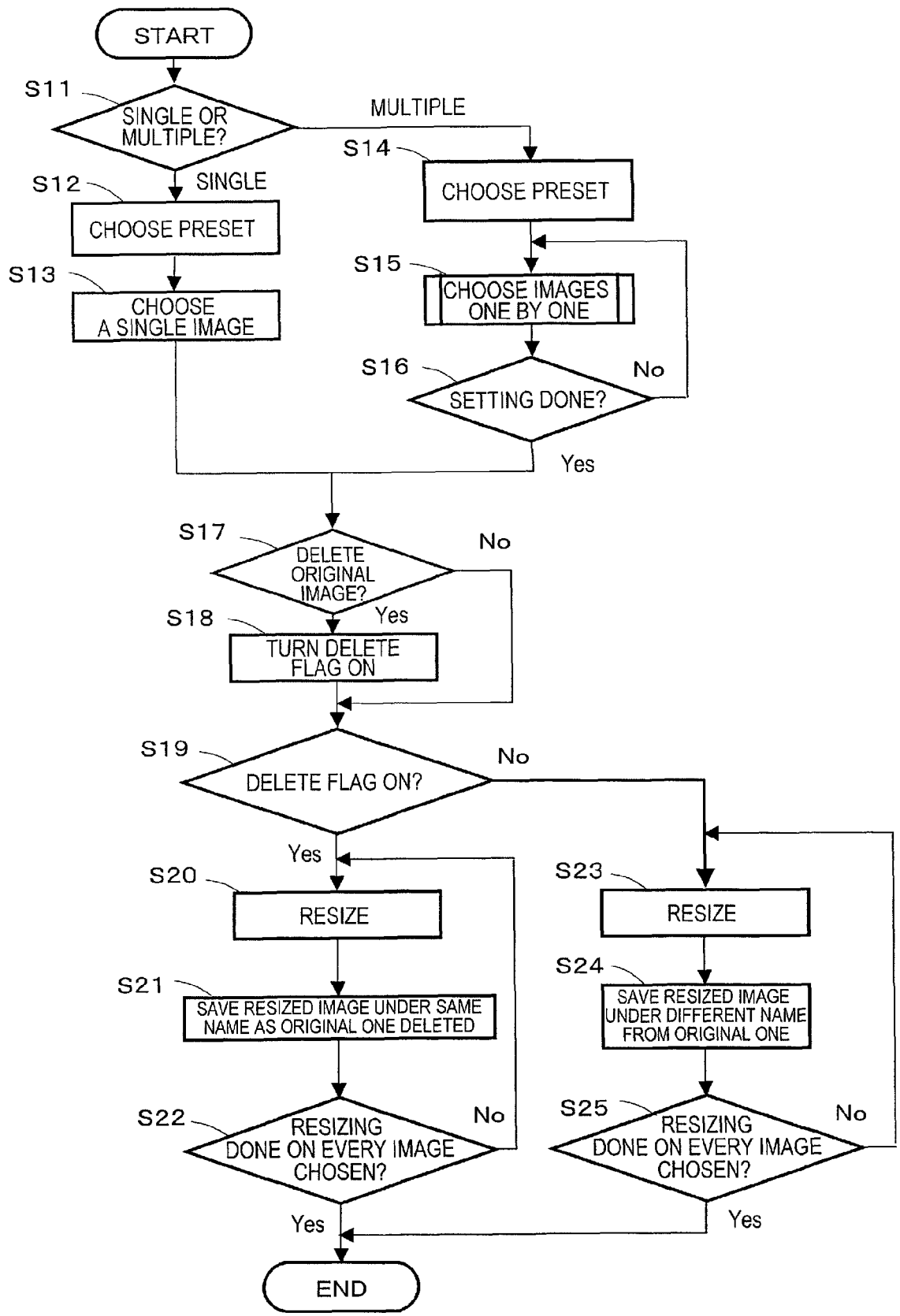
FIG. 8 is a flowchart illustrating how to get the resizing processing done.

FIG. 8 is a flowchart illustrating how to get the resizing processing done. First of all, the processing steps S11 through S19 will be described.

When the user requests "resizing", the first processing step S11 is performed by the control section 7.

Figure 9:
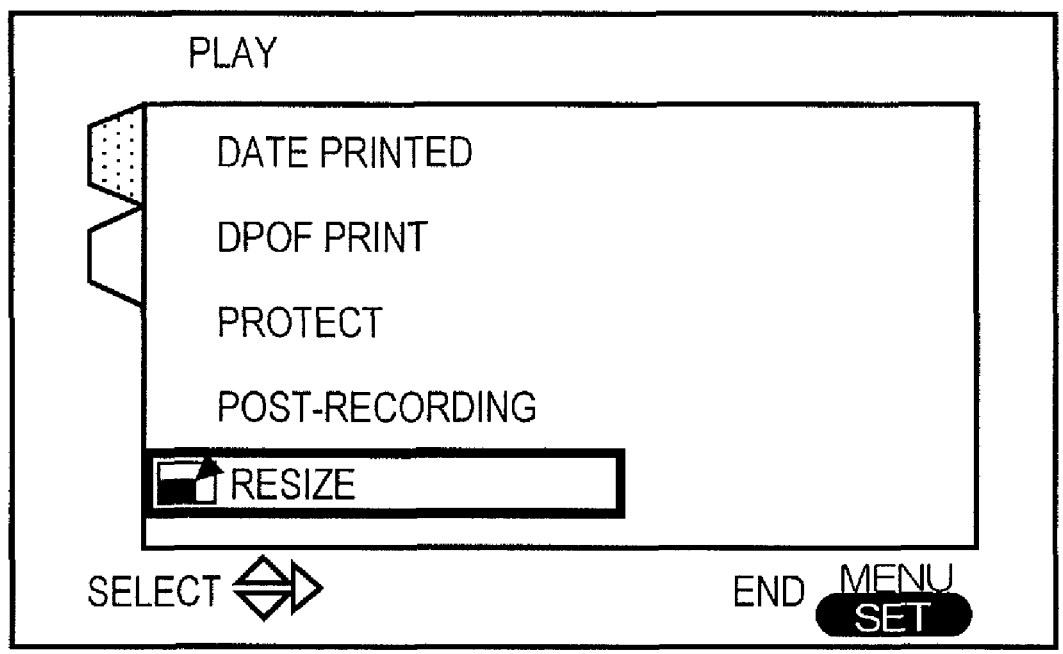
FIG. 9 illustrates a dialog box for allowing the user to select his or her desired option on the menu.

For example, when the user presses down the menu button 124, the control section 7 instructs the image processing section 4 to get a dialog box displayed on the LCD monitor 150 to allow him or her to select an option on the menu. FIG. 9 illustrates such a dialog box for allowing him or her to select his or her desired option on the menu. In this example, he or she selects the "resizing" option with the cross keys 125*b* and 125*d* (see FIG. 1) and then enters his or her selection with the cross key 125*a*.

Figure 10:
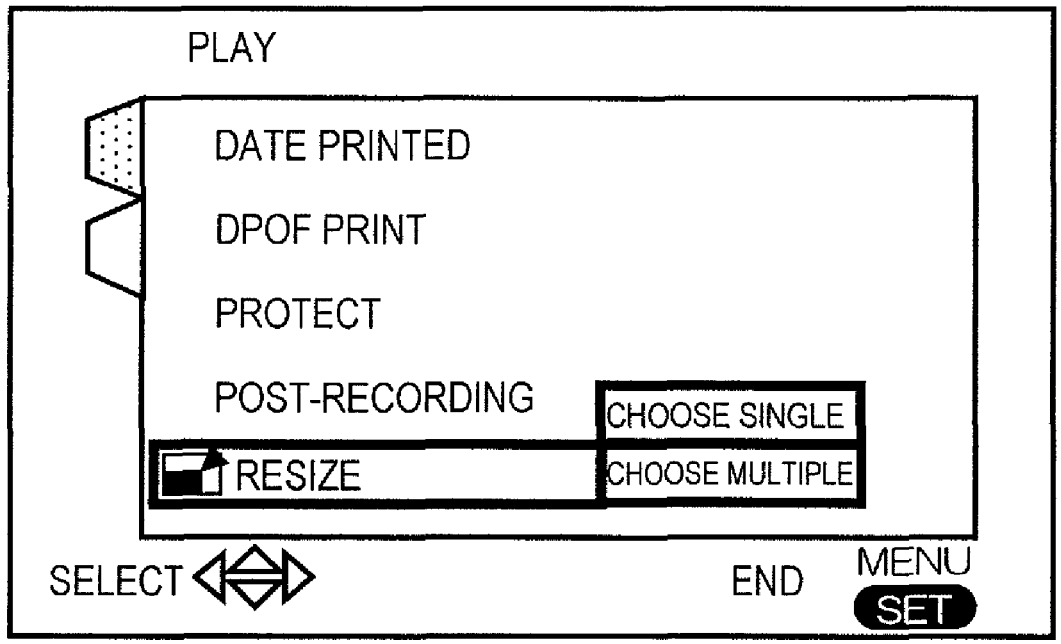
FIG. 10 illustrates a dialog box that prompts the user to decide how many images he or she'd like to resize.

When the user chooses and enters the "resizing" option, the image processing section 4 gets another dialog box displayed on the LCD monitor 150 to prompt him or her to decide how many images he or she'd like to resize. That is to say, the user needs to decide whether the resizing processing should be done on only one image or multiple images. FIG. 10 illustrates such a dialog box that prompts the user to decide the number of images to be resized. When he or she chooses either "single" or "multiple" with the cross keys 125*b* and 125*d* and enters his or her choice with the cross key 125*a*, the control section 7 accepts his or her decision in Step S11. Optionally, the user may go back to the dialog box for selecting an option on the menu (see FIG. 9) by pressing down the cross key 125*c*.

If the "single" option is chosen and entered (i.e., if the answer to the query of Step S11 shown in FIG. 8 is "single"), then the process advances to a "choose preset" processing step S12 and a "choose a single image" processing step S13. However, this series of processing steps has nothing to do with the present invention and a detailed description thereof will be omitted herein.

On the other hand, if the "multiple" option is chosen and entered (i.e., if the answer to the query of Step S11 shown in FIG. 8 is "multiple"), then the image processing section 4 gets a dialog box for prompting the user to choose a preset presented on the LCD monitor 150. As used herein, the "preset" refers to the predetermined size of a resized image or a target value thereof.

Figure 11:
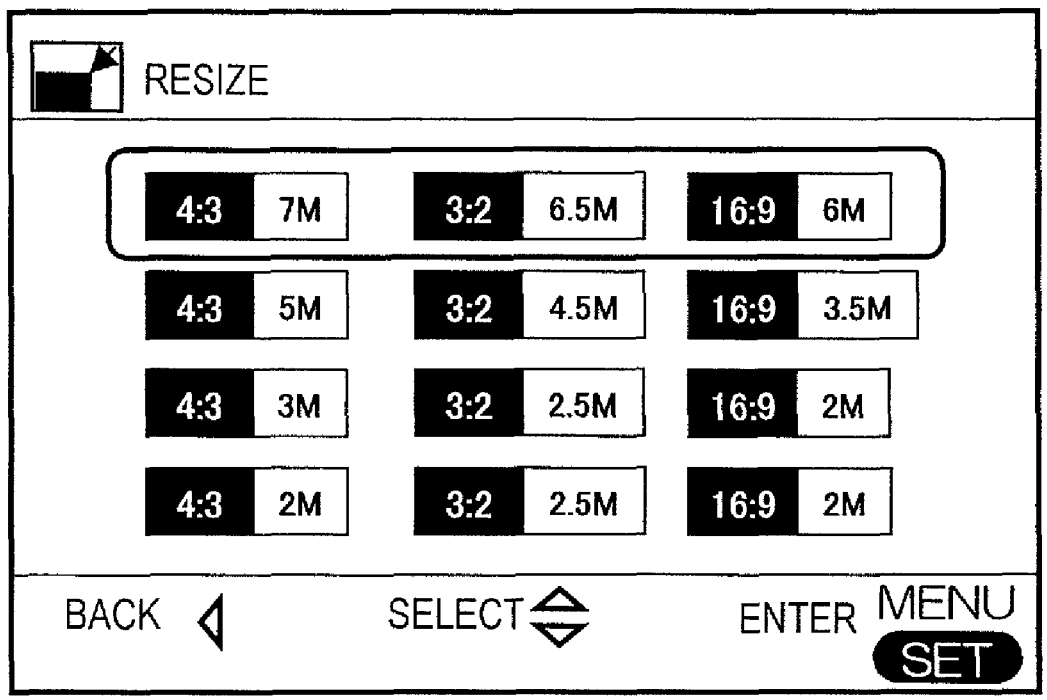
FIG. 11 illustrates a dialog box for prompting the user to choose a preset.

FIG. 11 illustrates such a dialog box for prompting the user to choose a preset. In this example, four presets are shown. These presets may be either stored in the ROM 43 or the RAM 42 (see FIG. 5) or included in the program 46 (see FIG. 5, too).

To prepare for a situation where the targets of the resizing processing include multiple image files with mutually different aspect ratios, each of these presets is defined such that those image files with different aspect ratios will have roughly the same size when resized.

In the example illustrated in FIG. 11, each preset shows approximately how large the image files with aspect ratios of 3:2, 4:3 and 16:9 will get when resized. FIG. 11 illustrates a situation where the uppermost one of the four presets is now chosen. By choosing the uppermost preset, the image files that were shot at aspect ratios of 4:3, 3:2 and 16:9 will be resized into approximately 7 M, 6.5 M and 6 M, respectively.

The user chooses one of these four presets with the cross keys 125*b* and 125*d* and enters his or her choice with the menu button 124. Then, the control section 7 accepts his or her decision in Step S14 shown in FIG. 8. Optionally, the user may go back to the dialog box for choosing the number of images to be resized (see FIG. 10) by pressing down the cross key 125*c*.

Figure 12:
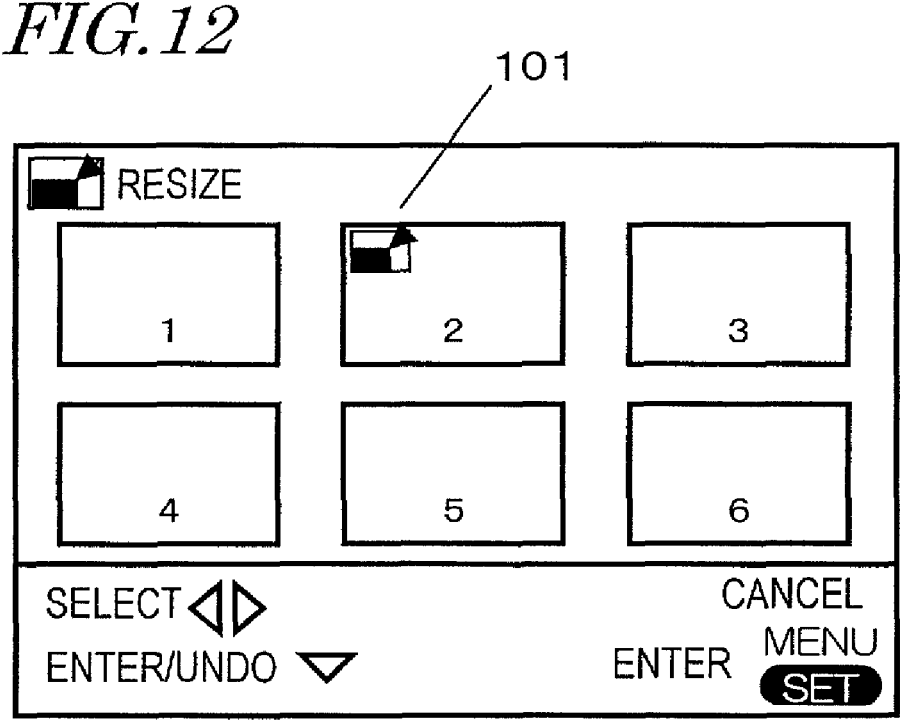
FIG. 12 illustrates a dialog box for choosing images to resize.

When the user chooses his or her desired preset and enters his or her choice, the image processing section 4 gets a dialog box for choosing images to resize displayed on the LCD monitor 150. Then, the control section 7 accepts his or her choice of the images to resize in Step S15 shown in FIG. 8. FIG. 12 illustrates such a dialog box for choosing images to resize. As shown in FIG. 12, on the image 2 that has been chosen as what should be resized, superimposed is an icon 101 indicating that this image has been chosen as a target of the resizing processing.

Hereinafter, it will be described in detail with reference to FIG. 13 how to choose an image as the target of the resizing processing.

Figure 13:
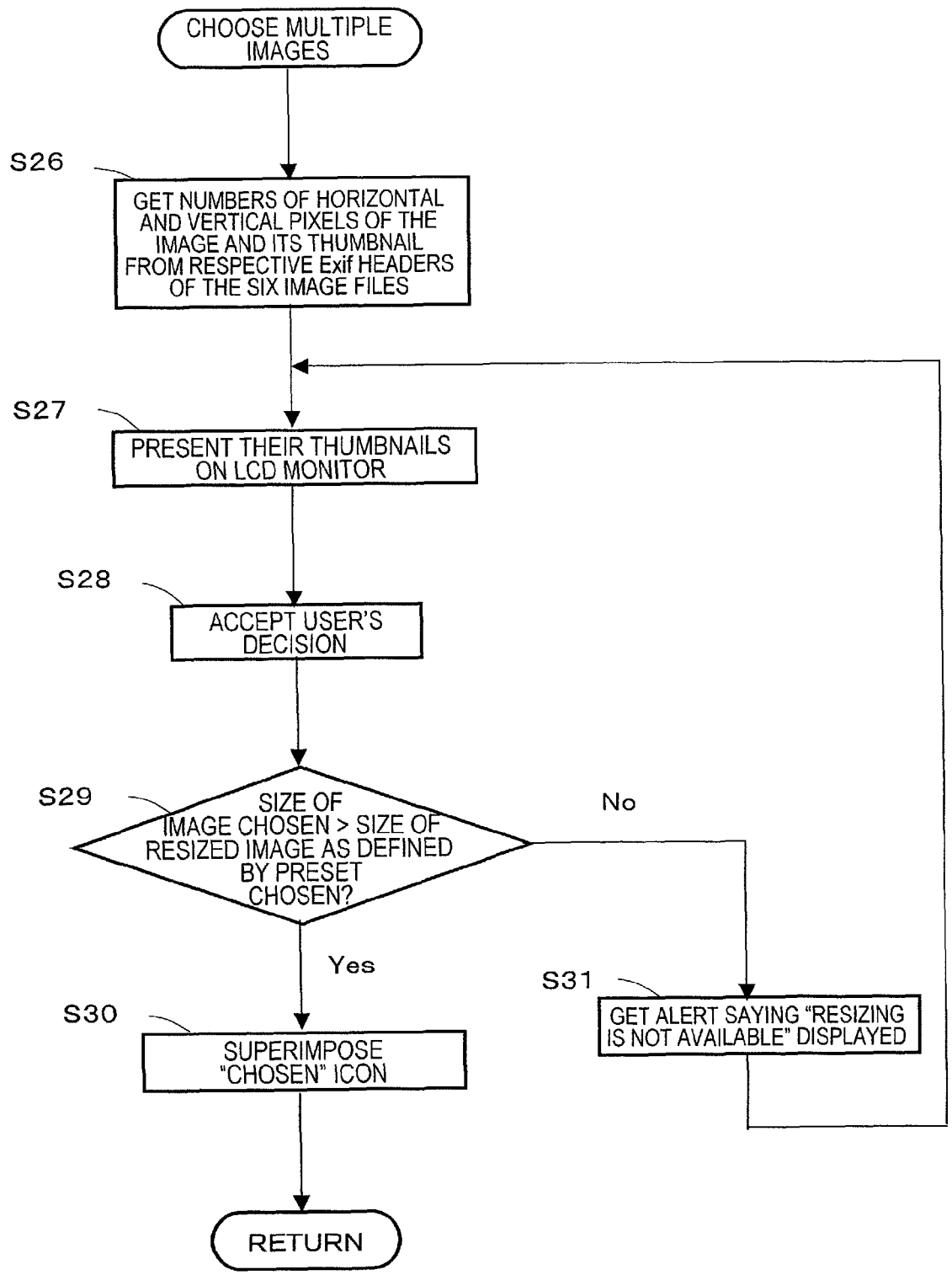
FIG. 13 is a flowchart illustrating exactly how to get the "choose an image" processing step S15 shown in FIG. 8 done.

FIG. 13 is a flowchart illustrating exactly how to get the "choose an image" processing step S15 done. First, the control section 7 instructs the image processing section 4 to get the numbers of horizontal and vertical pixels of the image and its thumbnail from the respective Exif headers of the six image files that are stored in the data storage section 5 (in Step S26) and then present their thumbnails on the LCD monitor 150 (in Step S27).

Next, when the user chooses the image to resize from the thumbnails #1 through #6 that are presented on the LCD monitor 150 by tapping the cross keys 125a and 125c and enters his or her choice with the cross key 125d, the control section 7 accepts his or her decision (in Step S28).

If necessary, the user may remove the image that has once been chosen as the target of the resizing processing with the cross key 125d by tapping the cross key 125d again. Also, the thumbnails #1 through #6 can be sequentially chosen with the cross keys 125a and 125c. However, if the user presses down the cross key 125a with the thumbnail #6 chosen, the control section 6 instructs the image processing section 4 to get the numbers of horizontal and vertical pixels of the image and its thumbnail from the respective Exif headers of another six image files that are stored in the data storage section 5 and then present their thumbnails on the LCD monitor 150.

In the flowchart shown in FIG. 13 illustrating exactly how to get the "choose multiple images" processing step S15 done, the processing step of getting the numbers of horizontal and vertical pixels of the image and its thumbnail from the respective Exif headers of another six image files and then presenting their thumbnails on the LCD monitor 150 is not shown to avoid complicating the drawing.

When the image to resize is chosen, the control section 7 sees if the size of the image chosen is larger than that of a resized image as defined by the currently chosen preset (in Step S29). Specifically, the control section 7 determines whether or not the image size calculated by the respective numbers of horizontal and vertical pixels of the image that have been gotten from the Exif header is larger than a resized image size associated with an aspect ratio for the image to be also calculated by the respective numbers of horizontal and vertical pixels of the image that have been gotten from the Exif header.

Optionally, the comparison does not have to be made based on the aspect ratio but may also be made based on only the number of vertical pixels or that of horizontal pixels.

If the size of the image chosen is larger than the resized image size in the currently chosen preset (i.e., if the answer to the query of Step S29 is YES), then the control section 7 instructs the image processing section 4 to superimpose the icon 101, indicating that this image has been chosen as the target of the resizing processing, on the thumbnail of the chosen image (in Step S30).

On the other hand, if the size of the image chosen is equal to or smaller than the resized image size in the currently chosen preset (i.e., if the answer to the query of Step S29 is NO), then the control section 7 instructs the image processing section 4 to get an alert saying "resizing is not available" displayed on the LCD monitor 150 (in Step S31). After that, the process goes back to the processing step S27 of presenting a thumbnail on the LCD monitor 150.

Figure 14:
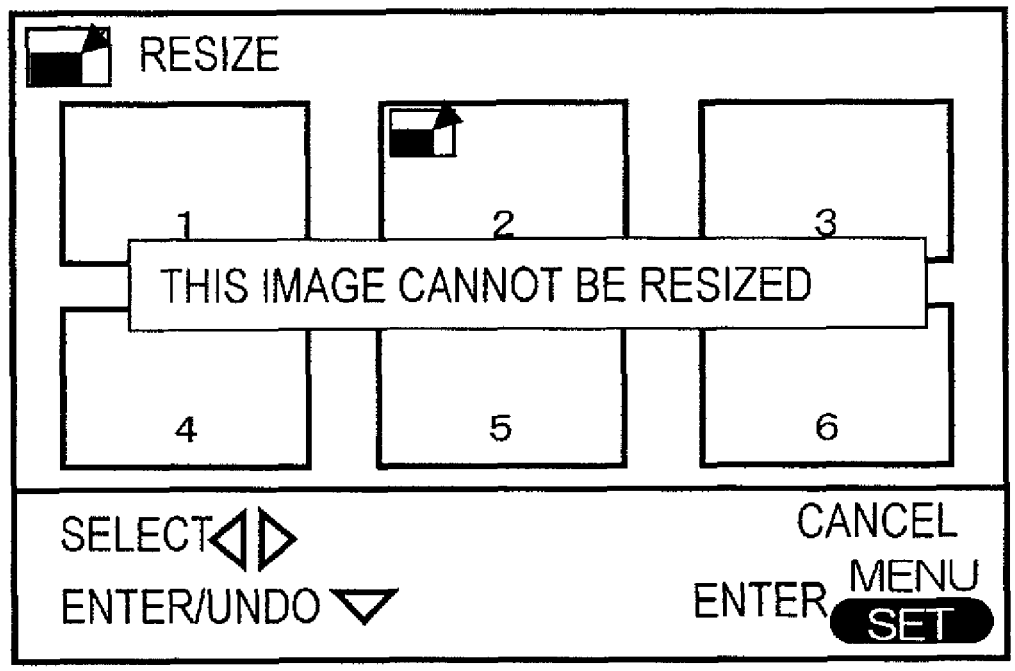
FIG. 14 illustrates an exemplary on-screen alert that says "this image cannot be resized".

FIG. 14 illustrates an exemplary on-screen alert that says "this image cannot be resized". Although not shown in FIG. 13, an alert that says "even if the size of the image chosen is NOT equal to or smaller than the resized image size in the currently chosen preset, a still picture with audio data, a moving picture, a RAW picture, or an image of which the aspect ratio is not 4:3, 3:2 or 16:9 cannot be resized, either" may also be displayed on the LCD monitor 150. Optionally, if the size of the image chosen is smaller than the resized image size in the currently chosen preset, zoom-in processing may be carried out.

If the image to resize has been chosen but if the image chosen turns out to be a non-resizable image, then the control section 7 determines whether or not the setting has been done yet (in Step S16). Specifically, if the menu button 124 is pressed down on the dialog box for choosing an image to resize (see FIG. 12), i.e., if the answer to the query of Step S16 is YES, then the setting has already been done. On the other hand, if the menu button 124 is not pressed down yet (i.e., if the answer to the query of Step S16 is NO), then the process goes back to the "choose an image" processing step S15 so as to allow the user to choose one more image to resize.

Figure 15:
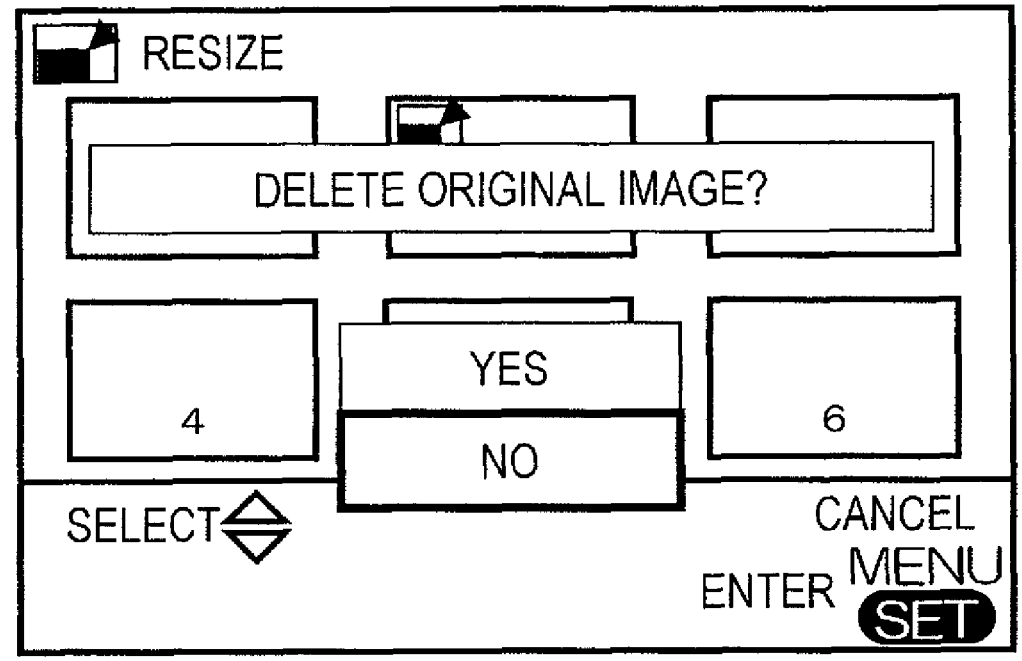
FIG. 15 illustrates an exemplary dialog box that asks the user if he or she wants to delete the original image once it has been resized.

When the choice of the image to resize is determined, the image processing section 4 gets another dialog box displayed on the LCD monitor 150. FIG. 15 illustrates an exemplary dialog box that asks the user if he or she wants to delete the original image once it has been resized. When the user chooses YES or NO with the cross keys 125b and 125d and enters his or her decision by pressing down the menu button 124, the control section 7 accepts his or her decision in Step S17.

If the user wants to delete the original image (i.e., if the answer to the query of Step S17 is YES), a delete flag is turned ON in a register in the control section 7 (in Step S18). On the other hand, if he or she does not want to delete the original image (i.e., if the answer to the query of Step S17 is NO), a delete flag is not turned ON in a register in the control section 7.

2-3. Resizing Processing

Next, the resizing processing, starting with the processing step S20 shown in FIG. 8, will be described.

When the user decides whether or not he or she wants to delete the original image once it has been resized, the control section 7 sees if the delete flag is ON (in Step S19). If the answer to the query of Step S19 is YES, the image processing section 4 performs the resizing processing in Step S20 and then gets the original image deleted by the input/output section 5a and saves the resized image under the same file name as the original one already deleted (in Step S21). On the other hand, if the delete flag is OFF (i.e., if the answer to the query of Step S19 is NO), the control section 7 performs the resizing processing in Step S23 and then saves the resized image under a different file name from the original one (in Step S24).

In FIG. 7 that illustrates diagrammatically the folder hierarchy of the memory card 5b, if the image P1000001.jpg that is stored on the layer right under 100 PANA folder 23 should be resized and then saved under a different file name from the original one, then the resized image may have a file name P1000004.jpg, for example.

The image processing section 4 of this preferred embodiment performs the resizing processing by decimating some pixels and then generating new pixels based on remaining neighboring pixels by interpolation (in Steps S20 and S23). In this manner, it is possible to prevent the image from getting flawed seriously. The resizing processing may be carried out as such a combination of decimation and interpolation so as to reduce the image size eventually. Or any other type of resizing processing may also be carried out as well.

No matter whether or not the delete flag is ON, until every image that has been designated as the target of the resizing processing has been resized, the image processing section 4 will repeatedly perform the resizing processing steps S20 and S23 and the saving processing steps S21 and S24 a number of times (in Steps S22 and S25). When every image to resize has been resized, the resizing processing ends.

As described above, according to this preferred embodiment, a number of image files with mutually different aspect ratios and image sizes can be resized collectively, thus realizing a more user-friendly resizing function.

3. Other Examples

Hereinafter, different types of processing from the preferred embodiment described above will be described.

3-1. Resizing Processing on a Folder Basis

In FIG. 7 that illustrates diagrammatically the folder hierarchy of the memory card 5b, the digital camera 100 may designate images to resize on a folder basis. For example, if the user chooses the 100_PANA folder 23, all of the image files P1000001.jpg through P1000003.jpg that are stored on the layer right under the 100_PANA folder 23 may be designated as the targets of the resizing processing. In that case, since multiple image files with mutually different aspect ratios and image sizes can be resized collectively on a folder basis, an even more user-friendly image resizing function can be provided.

3-2. Resizing on a Shooting Mode or Scene Mode Basis

In FIG. 6 that illustrates diagrammatically the architecture of an image file in the Exif format, the digital camera 100 may also designate the images to resize according to the shooting mode or scene mode that is written on the Exif header. For example, if the user has selected the portrait mode, then the digital camera 100 may designate every image that has ever been shot in the portrait mode as the targets of the resizing processing. In that case, since multiple image files with mutually different aspect ratios and image sizes can be resized collectively on a shooting mode or scene mode basis, an even more user-friendly image resizing function can be provided.

3-3. Resizing on a Shooting Period Basis

In FIG. 6 that illustrates diagrammatically the architecture of an image file in the Exif format, the digital camera 100 may also designate the images, of which the shooting dates and times written on the Exif header fall within a predetermined period, as the targets of the resizing processing. For example, if the user has specified the period from Aug. 21, 2007 through Sep. 7, 2007, then every image that was shot during that period will be resized.

3-4. Resizing According to the Intended Use of the Image

Optionally, the digital camera 100 may also designate the images to resize according to the purposes for which those images will be used when resized.

Portion (a) of FIG. 16 illustrates an exemplary dialog box that allows the user to decide whether he or she wants to get the resizing processing done either on an aspect ratio basis or according to the intended use.

If he or she chooses the resizing processing to get done on an aspect ratio basis, then a dialog box such as the one shown in portion (b) of FIG. 16 is displayed and the processing is carried out just as already described.

On the other hand, if the user chooses the resizing processing to get done according to the intended use, then a dialog box such as the one shown in portion (c) of FIG. 16 is displayed. In this example, the sizes of an image to resize are changed so that the resized image will have a readily printable size. That is to say, the resizing processing of this example is carried out mainly for the purpose of changing the on-screen sizes of an image, not the data sizes thereof.

Portion (c) of FIG. 16 illustrates an example in which a given image can be resized into an A3 (11"×17") printable size, an A4 (8.5"×11") printable size, an L/2 or L (10 cm×15 cm) printable size, an emailable size or an HDTV display size.

As described above, according to this preferred embodiment, a number of image files with mutually different aspect ratios and image sizes can be resized collectively on a shooting period basis, thus providing an even more serviceable resizing tool for users.

The data storage section 5 may be comprised of the input/output section 5a and the memory card 5b or could also be a memory IC or a hard disk that is built in the digital camera 100. The present invention can also be implemented effectively as an image processing program when a personal computer is used as the image processor.

In the preferred embodiments described above, the resizing processing is supposed to be carried out on the image files that are stored in the storage section 5. However, the present invention is in no way limited to those specific preferred embodiments. Alternatively, the image processor may also be designed to perform the resizing processing on the image data that has been captured but has not been stored in the storage section 5 yet. Since the information stored in the Exif header of an image file is already known once the image has been shot, the resizing processing of the present invention can also be performed on the image data yet to be stored in the storage section 5.

In the foregoing description of preferred embodiments, the present invention has been described as being applied to a digital camera. However, this is just an example. For instance, even a device that does not have the shooting optical system 1 (see FIG. 4) but that can also process the captured image data as described above is also an image processor according to the present invention. Also, as the hardware configuration shown in FIG. 5 is similar to that of a normal PC, a PC that can carry out the resizing processing described above on captured image data is also an image processor according to the present invention.

Industrial Applicability

According to the present invention, multiple image files with mutually different aspect ratios and image sizes can be resized collectively on a folder basis. Thus, the present invention is applicable for use in various image capture devices including digital cameras and cellphones with a camera, storage devices for storing or viewing image files, and TV sets with a memory card slot. The present invention is also applicable to an image processing program when a personal computer is used as the image processor, for example.

The invention claimed is:

1. An image processor comprising: a control section configured to select a particular set of resizing conditions from a plurality of sets of resizing conditions in accordance with a user's instruction; and an image processing section configured to perform resizing processing on each of a plurality of images in accordance with the selected particular set of resizing conditions, wherein each set of resizing conditions specifies a plurality of estimated resized image sizes, each estimated resized image size being associated with a respective image aspect ratio, wherein for said each of the plurality of images to be resized, the image processing section selects an estimated resized image size from the selected particular set of resizing conditions according to the aspect ratio of said each of the plurality of images and performs the resizing processing on said each of the plurality of images in accordance with the selected estimated resized image size, and wherein the plurality of estimated resized image sizes specified by the particular set of the resizing conditions fall within a first range of image sizes, and a plurality of estimated resized image sizes specified by another set of the resizing conditions fall within a second range of image sizes which is different from the first range.

2. The image processor of claim 1, wherein the image data of said each of the plurality of images to be resized includes aspect ratio information that tells the aspect ratio of that image, and wherein by reference to the aspect ratio information, the image processing section finds the aspect ratio of said each of the plurality images and selects an estimated resized image size from the selected particular set of resizing conditions.

3. The image processor of claim 1, wherein the plurality of sets of resizing conditions define mutually different combinations of estimated resized image sizes for a plurality of image aspect ratios.

4. The image processor of claim 1, further comprising:
a display device for presenting an image thereon; and
an interface that allows the user to choose the image presented on the display device,
wherein the image processing section designates the image that has been chosen with the interface as the image to be resized.

5. The image processor of claim 1, wherein image data of each of a plurality of images to be resized includes thumbnail data, and wherein the image processor further includes:
a display device for presenting a thumbnail thereon; and
an interface that allows the user to choose the thumbnail presented on the display device, and
wherein the image processing section designates the image associated with the thumbnail that has been chosen with the interface as the image to be resized.

6. The image processor of claim 1, further comprising:
an interface that accepts a user's command; and
a storage section that stores the image data of the plurality of images in at least one folder,
wherein the image processing section performs the resizing processing on an image, of which the image data is stored in a folder that has been specified beforehand in accordance with the command accepted at the interface.

7. The image processor of claim 1, further comprising:
an interface that accepts a user's command; and
a storage section that stores the image data of the plurality of images,
wherein the image data of each of the plurality of images includes shooting condition information representing a condition on which that image was shot, and
wherein the image processing section performs the resizing processing on an image, of which the image data matches shooting condition information that has been specified beforehand in accordance with the command accepted at the interface.

8. The image processor of claim 1, further comprising an interface that accepts a user's command,
wherein the image processing section performs the resizing processing on an image, of which the image data matches a shooting period that has been specified beforehand in accordance with the command accepted at the interface.

9. The image processor of claim 6, wherein the storage section includes a removable storage medium.

10. The image processor of claim 7, wherein the storage section includes a removable storage medium.

* * * * *